(12) United States Patent
Rahman et al.

(10) Patent No.: US 8,138,651 B2
(45) Date of Patent: Mar. 20, 2012

(54) METHODS AND APPARATUS FOR A PERMANENT MAGNET MACHINE WITH AN ADDED AIR BARRIER

(75) Inventors: Khwaja M. Rahman, Troy, MI (US); Edward L. Kaiser, Orion, MI (US); Matthew D. Laba, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 82 days.

(21) Appl. No.: 12/269,463

(22) Filed: Nov. 12, 2008

(65) Prior Publication Data

US 2009/0140592 A1   Jun. 4, 2009

Related U.S. Application Data

(60) Provisional application No. 60/991,310, filed on Nov. 30, 2007.

(51) Int. Cl.
*H02K 1/27* (2006.01)
*H02K 21/14* (2006.01)

(52) U.S. Cl. .................................. 310/156.53

(58) Field of Classification Search ............ 310/156.01, 310/156.07–156.08, 156.53, 156.56–156.57
See application file for complete search history.

(56) References Cited

U.S. PATENT DOCUMENTS

| 5,731,647 | A * | 3/1998 | Schuller et al. ............ 310/114 |
| 6,353,275 | B1 * | 3/2002 | Nishiyama et al. ....... 310/156.53 |
| 6,946,766 | B2 * | 9/2005 | Gary et al. ............... 310/156.53 |
| 2006/0103335 | A1 * | 5/2006 | Kolehmainen et al. ......... 318/81 |
| 2006/0113858 | A1 * | 6/2006 | Hino et al. ................ 310/156.53 |
| 2007/0052313 | A1 * | 3/2007 | Takahashi et al. ........ 310/156.53 |
| 2007/0138892 | A1 * | 6/2007 | Horst ....................... 310/156.53 |
| 2008/0007131 | A1 * | 1/2008 | Cai et al. .................. 310/156.38 |
| 2009/0026867 | A1 * | 1/2009 | Haruno et al. ........... 310/156.21 |
| 2009/0045688 | A1 * | 2/2009 | Liang et al. .............. 310/156.07 |

FOREIGN PATENT DOCUMENTS

| JP | 2003116235 A | * | 4/2003 |
| JP | 2003143788 A | * | 5/2003 |
| JP | 2006254629 A | * | 9/2006 |
| JP | 2006264629 A |   | 10/2006 |
| JP | 2006311730 A | * | 11/2006 |
| JP | 2007068357 A | * | 3/2007 |
| WO | WO 2007100119 A1 | * | 9/2007 |

OTHER PUBLICATIONS

Takehara et al., JP 2003116235 A Machine Translation, Apr. 2003.*
Kamiya, JP 2006254629A Machine Translation, Sep. 2006.*
Office Action, dated Sep. 8, 2011, for Chinese Patent Application No. 200810179831.4.

* cited by examiner

*Primary Examiner* — Quyen Leung
*Assistant Examiner* — Eric Johnson
(74) *Attorney, Agent, or Firm* — Ingrassia Fisher & Lorenz, P.C.

(57) ABSTRACT

An internal permanent magnet machine ("IPM machine") of the type used, for example, with traction motors and hybrid electric vehicles, includes a rotor with an additional air barrier provided above the first magnet barrier in the same rotor slot. Each magnet only fills a portion of each cavity, thereby defining the air barriers. The added air barrier above the permanent magnet of the first layer acts as a barrier to the first layer magnet and lowers the magnet flux.

19 Claims, 3 Drawing Sheets

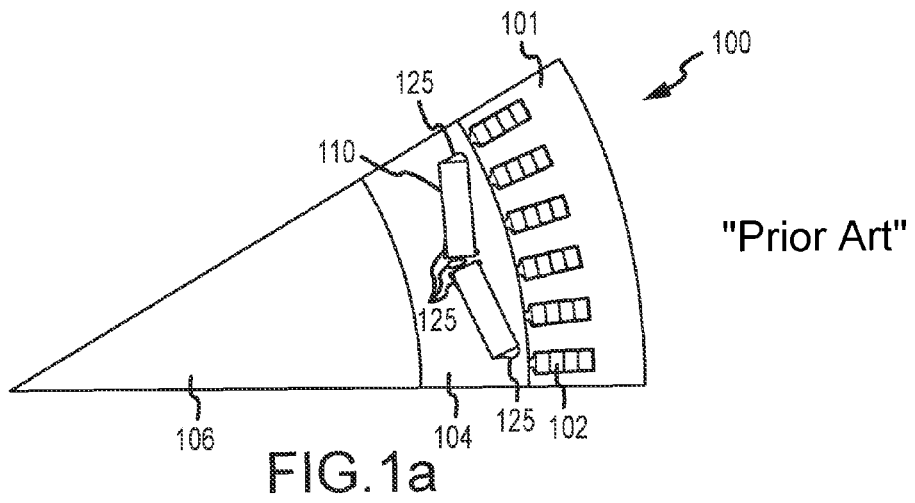
FIG.1a "Prior Art"
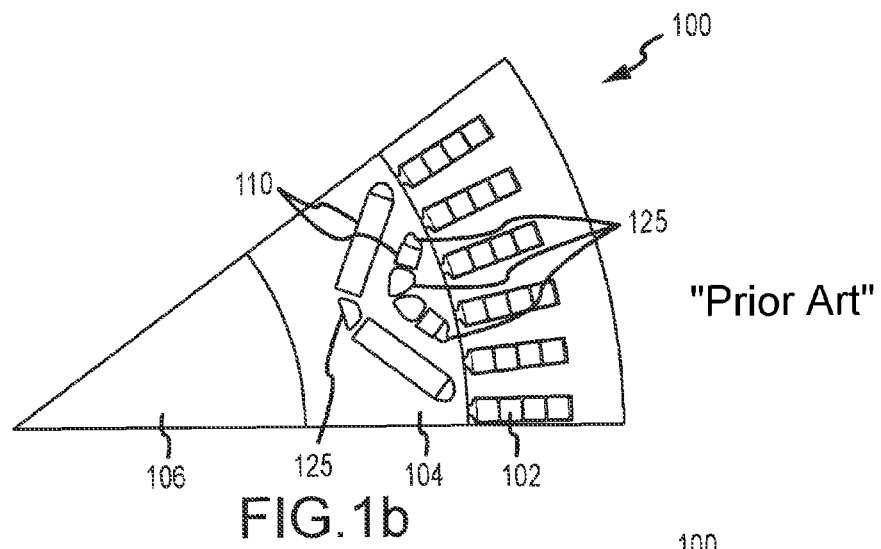
FIG.1b "Prior Art"
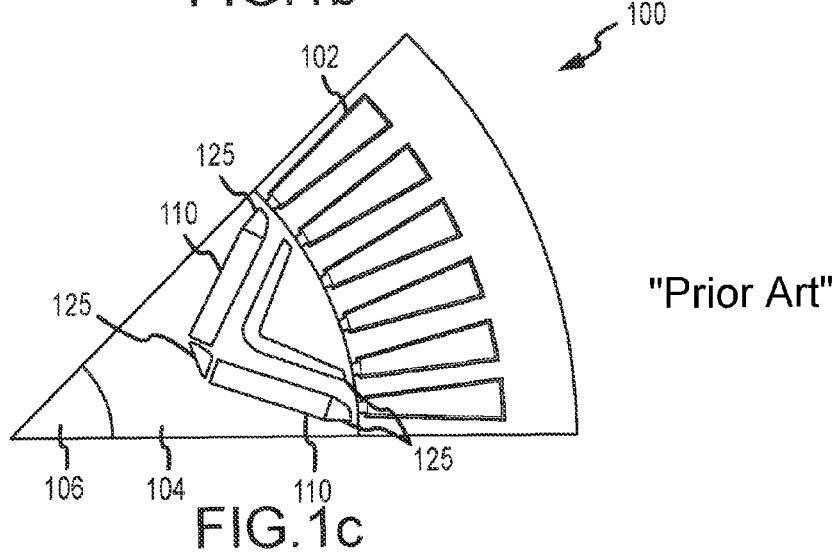
FIG.1c "Prior Art"

METHODS AND APPARATUS FOR A PERMANENT MAGNET MACHINE WITH AN ADDED AIR BARRIER

CROSS-REFERENCE

This application claims priority to U.S. Provisional Patent Application Ser. No. 60/991,310, filed Nov. 30, 2007.

TECHNICAL FIELD

The present invention generally relates to magnetic devices such as electrical motors, and more particularly relates to interior permanent magnet machines.

BACKGROUND

Interior permanent magnet (IPM) machines are favored for fuel cell and hybrid electric vehicle operations due to their desirable characteristics—i.e., good torque density, good overall efficiency, good constant power range, etc. The rotor field in a permanent magnet machine is obtained by virtue of its structure, unlike other machines such as induction, switched or synchronous reluctance machines, in which the field is generated by a stator current supplied by a source. As a result, permanent magnet machines exhibit superior efficiency as compared to other such machines.

However, as with surface PM machines, an IPM machine is burdened by the fact that the permanent magnet field is present even when the machine is not powered, resulting in losses induced by the rotating permanent magnet field of the rotor. Furthermore, the permanent magnet field induces voltage ("back EMF") into the stator winding. For a strong permanent magnet machine, this back EMF can be quite significant.

In an IPM machine, a second rotor barrier is sometimes added, and a small magnet (used to saturate the bridge above the rotor barrier) is optionally placed therein. This second layer of magnet or air pocket acts as a barrier to the permanent magnet field of the lower primary magnet layer, reducing the air-gap magnet flux, and also lowering the machine back EMF and losses induced by the permanent magnet field. For some machines, due to limited space, the second barrier can not easily be added. Furthermore, addition of the second barrier may weaken the rotor structure or may not cover the entire lower magnet, resulting in some portion of the lower barrier magnet directly exposed to the air-gap, in turn leading to higher losses and higher back EMF.

Accordingly, it is desirable to provide IPM machines that reduce field-related losses while minimizing back EMF and air-gap magnetic flux. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIG. 1 depicts, in cross-section, various internal permanent magnet (IPM) machines;

DETAILED DESCRIPTION

Figure 2:
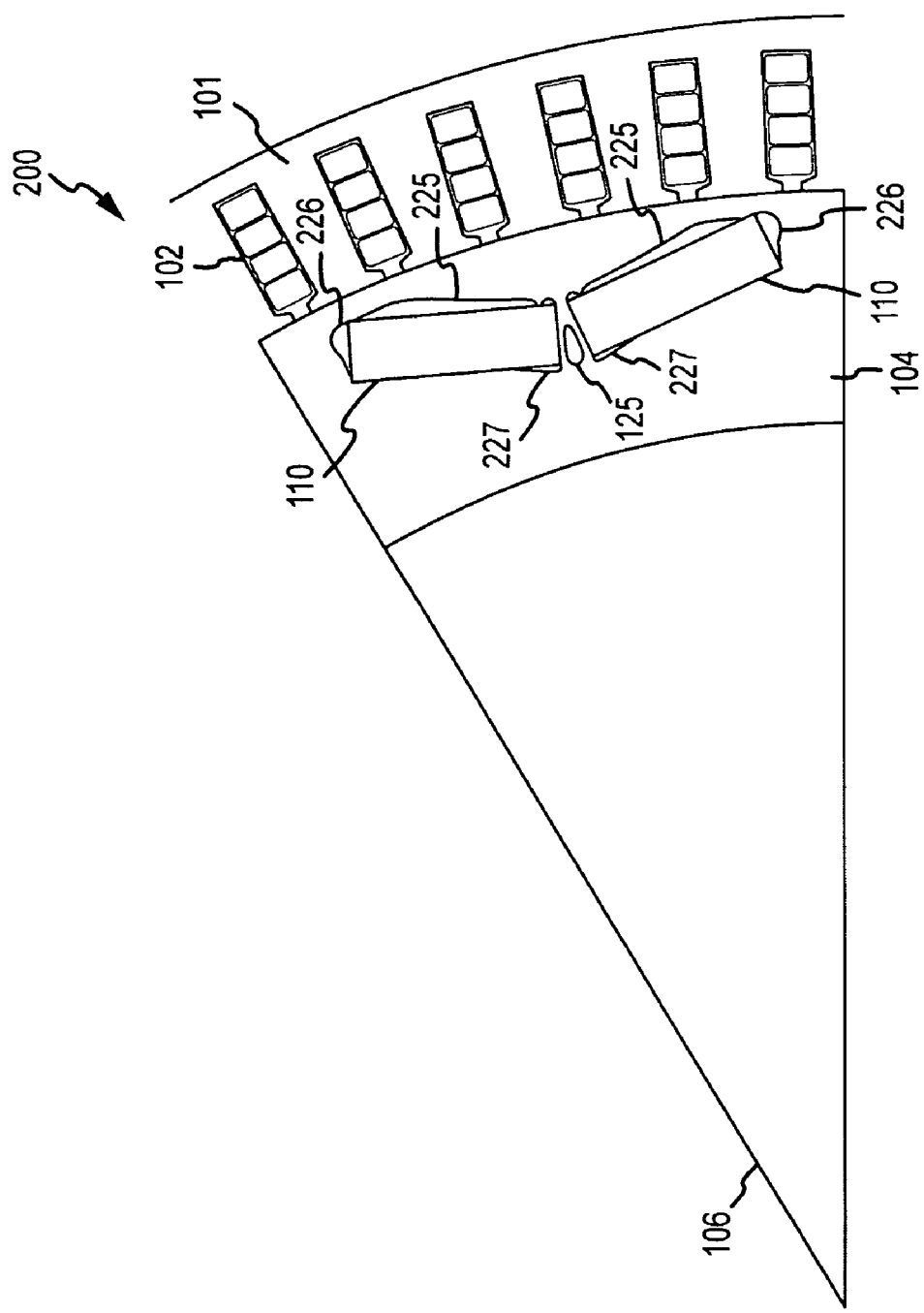
FIG. 2 depicts, in cross-section, an IPM machine in accordance with one embodiment.

The following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to electrical motors, magnetism, and the like are not described in detail herein.

In general, the various embodiments are directed to a permanent magnet machine ("PM machine"), and more specifically an internal permanent magnet machine ("IPM machine") that includes a rotor with an additional air barrier above the first magnet barrier in the same rotor slot. As a result, no second barrier is needed (i.e., to lower the air-gap flux). The added air barrier above the permanent magnet of the first layer acts as a barrier to the first layer magnet and lowers the magnet flux. Hence, the machine back EMF and the magnet induced losses (e.g., iron loss) are reduced. The added air barrier above the magnet also increases rotor saliency to an extent similar to a two-barrier rotor geometry. This partially compensates for the reduction in torque due to the reduction of the permanent magnet field in the air-gap.

Interior PM machines often incorporate one or more rotor barriers (or simply "barriers"). These barriers introduce resistance (reluctance) to magnetic field thus introducing rotor saliency. This saliency is a source of torque and is commonly well-known as reluctance torque. Higher the number of barriers is usually higher is the reluctance torque. FIGS. 1(*a*)-(*c*), for example, illustrate partial cross-sections through various exemplary IPM machines 100 with single and double barrier rotors 106. More particular, FIG. 1(*a*) illustrates a rotor 100 with magnets 110 and rotor slots or cavities (the barrier) 125 incorporated into the structure at various locations with respect to magnets 110. As is conventional, IPM 100 includes a stator 101 having a plurality of windings 102 magnetically interacting with magnets 110 within rotor 106. Various cavities are provided within region 104 of rotor 106, and all or a portion of these cavities are filled with permanent magnets in the conventional manner, depending upon the number of layers incorporated into the structure.

FIG. 1(*b*), more particularly, depicts a two-barrier PM rotor with the second barrier partially filed with magnets 110. Similarly, FIG. 1(*c*) illustrates a two-barrier PM rotor with no magnets in the second layer—i.e., the second layer comprises only an air-filled cavity. The added second barrier shown in FIGS. 1(*b*) and 1(*c*) adds resistance to the lower magnet barrier, lowering the air-gap magnet flux. However, as mentioned previously, addition of the second barrier in the rotor can mechanically weaken the rotor. Also, for some machines, addition of any such second barrier is not geometrically feasible due to, for example, limited space (e.g., the rotor of FIG. 1(*a*)).

Rotors with more than two barriers may also be provided; however, such designs undesirably increase manufacturing complexity. Increasing the number of barriers improves rotor saliency, and thus improves machine torque. Moreover, the second rotor barrier often works as a barrier to the inner magnet layer, consequently lowering the magnet flux in the air-gap. Lowering of magnet flux in the air-gap reduces the magnet torque, but is somewhat compensated by the increased saliency of the rotor as mentioned earlier.

In hybrid applications, when the PM machine is part of a transmission, very often the machine is rotating in conjunction with a different gear-set even though machine is producing no torque or is producing very low torque. If the no-load or light load operation is a substantial portion of the machine drive cycle, the overall efficiency of the transmission is affected. Rotating magnet flux also induces voltage in the stator winding, commonly referred to as back EMF. The high magnet flux of a permanent magnet rotor may induce very high voltage in the stator, especially during high speed operation of the machine. Therefore, lowering of the machine air-gap flux is very desirable for such machines.

FIG. 2 depicts an IPM machine 200 in accordance with one embodiment of the present invention in which an air-barrier is incorporated into the cavity or slot where the magnet is placed, rather than adding an additional barrier. That is, as shown, a pair of magnets 110 are placed within respective cavities that are configured to be larger than the magnets themselves, thus allowing air barriers to be formed adjacent to the magnets.

In the cross-sectional illustration shown in FIG. 2, the cavity includes the union of the area filled by magnet 110 and the area defined by the various air pockets adjacent thereto, i.e.: air pockets 226, 225, and 227. The term "cavity" is thus used to refer to a region thus defined prior to insertion of magnet 110. While FIG. 2 illustrates a cross-sectional view of magnets 110 and air pockets 225, 226, and 227, it will be understood that the cavity extends into region 104 of rotor 106 and will define a three-dimensional volume having any suitable shape.

The size, location, and geometry of each air pocket 225, 226, and 227 may be selected to achieve the desired design objectives. In the illustrated embodiment, for example, air barriers 225 are configured adjacent to the "top" of magnets 110 (i.e., toward the outer surface of the rotor 101, radially). These top air barriers 225 are generally triangular (or trianguloid) and extend substantially the entire length of each magnet 110. In this embodiment, pairs of rectangular magnets are configured angled toward each other—i.e., defining an obtuse angle facing outward toward stator 101, and the widest portion of air pockets 225 (corresponding to each apex) is adjacent to that corner of magnet 110 that is closest to stator 101.

In this embodiment, additional "bottom" air barriers 227 are defined on the opposite side of magnet 110 from air gaps 225, and have a cross-sectional area that is substantially smaller than that of air gaps 225. In the illustrated embodiment, bottom air gaps 227 are also generally triangular and are adjacent to a corner of magnet 110.

Further illustrated in FIG. 2 are "side" air gaps 226 which, in this embodiment, are provided adjacent to an edge of magnet 110 as shown. In one embodiment, side air gaps 226 extend the full height (radially) of magnets 110.

As illustrated, additional conventional air pocket (rotor slot) 125 (i.e., air pockets that are non-contiguous with the cavities defined above, may also be provided within rotor 106.

The structures described above are advantageous in a number of respects. In particular, the added air barrier 225 above the permanent magnet 110 acts as a barrier to the first layer magnet and lowers the magnet flux, thereby also reducing machine back EMF and magnet induced losses. At the same time, rotor saliency is increased due to the reduction of the d-axis (magnet axis) inductance.

Figure 3:
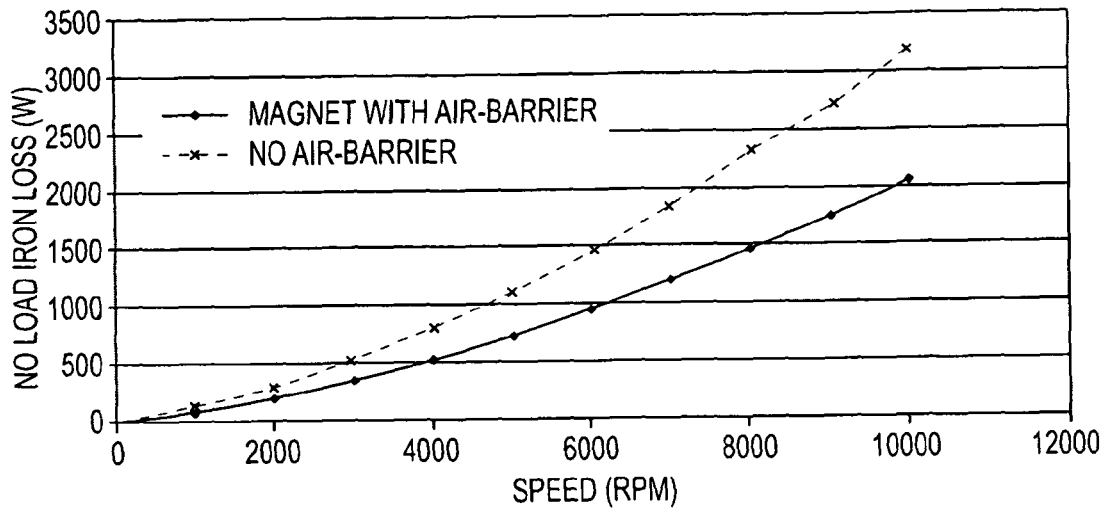
FIGS. 3 and 4 are graphs showing example empirical results of an IPM machine in accordance with one embodiment.
Figure 4:
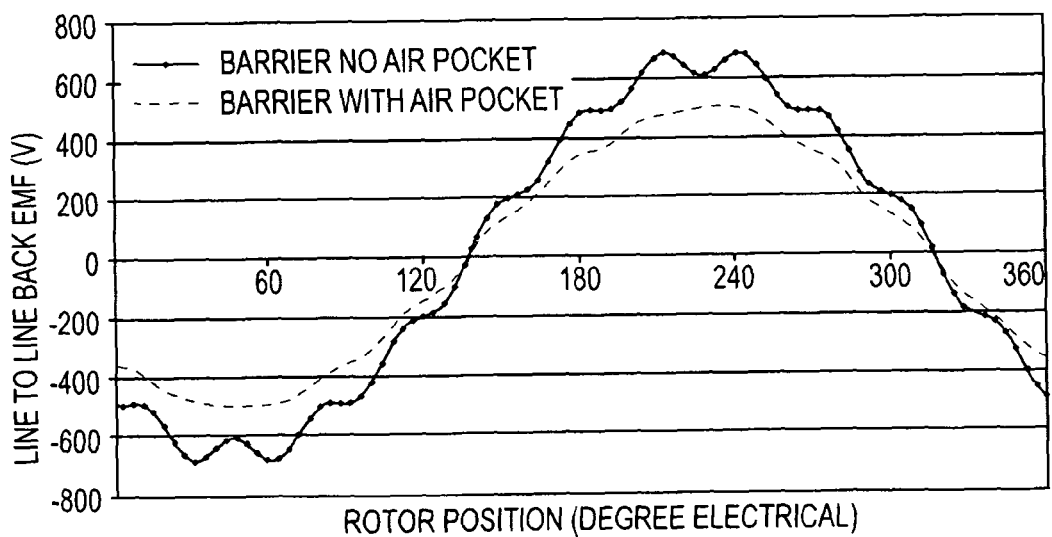

FIG. 3, for example, is an empirical graph showing the no-load iron loss (spin loss) for the rotor of FIG. 2 compared to that for the rotor of FIG. 1(a) (no air-barrier). As can be seen, iron loss is greatly reduced. The addition of the air barrier also lowers machine back EMF. FIG. 4 depicts the back EMF of the above two rotors. As can be seen, machine back EMF is significantly reduced. The reduction in machine torque due to addition of the air-barrier (lower magnet flux) is minimal as some of the torque loss is compensated by the increased saliency of the rotor (higher reluctance torque).

While at least one example embodiment has been presented in the foregoing detailed description, it should be appreciated that a vast number of variations exist. For example, additional barrier layers may be incorporated in addition to the single layer illustrated. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

What is claimed is:

1. An interior permanent magnet machine comprising:
    a wound stator;
    a rotor configured to magnetically interact with the wound stator, the rotor having an outer surface and a rotational axis extending through a center of the rotor;
    a pair of cavities provided within the rotor, each cavity having a total volume and a generally rectangular opening having a cavity axis, a width dimension, and a length dimension, wherein the length dimension is greater than the width dimension, the cavity axis lies parallel to the length dimension, and the cavity axes of the pair of cavities together define a plane that is orthogonal to the rotational axis;
    a pair of magnets provided within respective cavities of the pair of cavities such that the total volume of each cavity is only partially filled by the respective magnet and such that air barriers are formed adjacent to each magnet;
    wherein the pair of magnets each have top edges parallel to the cavity axis that together define an obtuse angle facing radially outward from the center of the rotor, and wherein the air barriers include a pair of top air barriers adjacent to and extending along substantially the entire length of the top edges of each of the respective magnets.

2. The interior permanent magnet machine of claim 1, wherein the top air barriers are generally trianguloid.

3. The interior permanent magnet machine of claim 2, wherein the generally trianguloid top air barriers each have an apex adjacent to a corner of the magnet closest to the outer surface.

4. The interior permanent magnet machine of claim 1, wherein the air barriers further include a side air barrier adjacent to the top air barrier.

5. The interior permanent magnet machine of claim 1, wherein the air barriers further include a bottom air barrier adjacent to the magnet opposite the top air barrier.

6. The interior permanent magnet machine of claim 1, further including a second set of air barriers non-contiguous with the air barriers formed by the cavities.

7. A method of manufacturing an interior permanent magnet machine, the method comprising:

provided a wound stator;

providing a rotor having an outer surface and a rotational axis extending through a center of the rotor;

forming a plurality of cavities within the rotor, each cavity having a total volume and a generally rectangular opening having a cavity axis, a width dimension, and a length dimension, wherein the length dimension is greater than the width dimension, the cavity axis lies parallel to the length dimension, and the cavity axes of the pair of cavities together define a plane that is orthogonal to the rotational axis;

disposing a plurality of magnets within the plurality of cavities such that the total volume of each cavity is only partially filled by the respective magnet and such that air barriers are formed adjacent to each magnet, and such that a pair of magnets have respective top edges parallel to their respective cavity axes, wherein the top edges together define an obtuse angle facing radially outward from the center of the rotor, and the air barriers include a pair of top air barriers adjacent to and extending along substantially the entire length of the top edges of each of the respective magnets; and placing the wound stator in magnetic communication with the rotor.

8. The method of claim 7, wherein the top air barriers are generally trianguloid.

9. The method of claim 8, wherein the generally trianguloid top air barriers have an apex adjacent to a corner of the magnet closest to the outer surface.

10. The method of claim 7, wherein the air barriers further include a side air barrier adjacent to the top air barrier.

11. The method of claim 7, wherein the air barriers further include a bottom air barrier adjacent to the magnet opposite the top air barrier.

12. The method of claim 7, further including a second set of air barriers non-contiguous with the air barriers formed by the cavities.

13. A traction motor of the type used in connection with a hybrid electric vehicle, the traction motor comprising:

a wound stator;

a rotor configured to magnetically interact with the wound stator, the rotor having an outer surface and a rotational axis extending through a center of the rotor;

a plurality of cavities provided within the rotor, each cavity having a total volume and a generally rectangular opening having a cavity axis, a width dimension, and a length dimension, wherein the length dimension is greater than the width dimension, the cavity axis lies parallel to the length dimension, and the cavity axes of a pair of cavities together define a plane that is orthogonal to the rotational axis;

a plurality of magnets provided within the plurality of cavities such that the total volume of each cavity is only partially filled by the respective magnet and such that air barriers are formed adjacent to each magnet, wherein a pair of the plurality of magnets have respective top edges parallel to the cavity axes, the top edges together define an obtuse angle facing radially outward from the center of the rotor, and wherein the air barriers include a pair of top air barriers adjacent to and extending along substantially the entire length of the top edges of each of the respective magnets.

14. The traction motor of claim 13, wherein the top air barriers are generally trianguloid.

15. The traction motor of claim 14, wherein the generally trianguloid top air barriers have an apex adjacent to a corner of the magnet closest to the outer surface.

16. The traction motor of claim 14, wherein the air barriers further include a side air barrier adjacent to the top air barrier.

17. The traction motor of claim 14, wherein the air barriers further include a bottom air barrier adjacent to the magnet opposite the top air barrier.

18. The traction motor of claim 14, further including a second set of air barriers non-contiguous with the air barriers formed by the cavities.

19. The interior permanent magnet machine of claim 2, wherein each magnet of the pair of magnets has a first corner closest to the stator, and wherein each of the top air barriers has an apex that is adjacent to the first corner of its respective magnet.

* * * * *